(12) United States Patent
Chen et al.

(10) Patent No.: US 11,391,646 B2
(45) Date of Patent: Jul. 19, 2022

(54) AUTOMATIC MOUNTING AND DEMOUNTING DEVICE AND SYSTEM FOR MOTOR TESTING PLATFORM

(71) Applicant: CHROMA ATE INC., Taoyuan (TW)

(72) Inventors: Ming-Yen Chen, Taoyuan (TW);
Jian-Lin Lee, Taoyuan (TW);
Sheng-Wei Lin, Taoyuan (TW);
Chih-Hsien Wang, Taoyuan (TW)

(73) Assignee: CHROMA ATE INC., Taoyuan (TW)

( * ) Notice: Subject to any disclaimer, the term of this patent is extended or adjusted under 35 U.S.C. 154(b) by 177 days.

(21) Appl. No.: 16/905,006

(22) Filed: Jun. 18, 2020

(65) Prior Publication Data
US 2021/0010901 A1 Jan. 14, 2021

(30) Foreign Application Priority Data
Jul. 9, 2019 (TW) .................................. 108124091

(51) Int. Cl.
*G01M 15/02* (2006.01)
(52) U.S. Cl.
CPC ................... *G01M 15/02* (2013.01)
(58) Field of Classification Search
CPC .... G01M 15/02; G01M 13/025; B25J 9/1694; B25J 19/02–023; B25J 13/08–088; B25J 9/0093; G01R 31/2887; G05B 2219/37404; G05B 2219/40082; G05B 2219/49117; G05B 2219/45089
USPC .......................................... 73/116.01–116.5
See application file for complete search history.

(56) References Cited

U.S. PATENT DOCUMENTS

| | | | |
|---|---|---|---|
| 2009/0025466 A1* | 1/2009 | Moritani | G01M 15/02 73/114.37 |
| 2013/0081919 A1* | 4/2013 | Sakai | F16D 11/14 192/69.8 |
| 2019/0054587 A1* | 2/2019 | Wahrén | B65G 47/684 |
| 2019/0321967 A1* | 10/2019 | Ooba | G05B 19/4182 |

\* cited by examiner

*Primary Examiner* — Eric S. McCall
*Assistant Examiner* — Timothy P Graves
(74) *Attorney, Agent, or Firm* — WPAT, PC

(57) ABSTRACT

An automatic mounting and demounting device and system for a motor testing platform, adapted to enable a control host to control automatic mounting and demounting between an axle of a motor under test and an axle of a testing apparatus, includes a mobile platform and a positional information sensing member. The control host controls the mobile platform according to positional information generated by the positional information sensing member, such that a carrier for carrying the motor under test is automatically driven to a corresponding position to thereby effect alignment and connection or separation of the axle of the motor under test and the axle of the testing apparatus. Therefore, preparation for the motor dynamics testing is automatically carried out effectively and correctly, thereby reducing the time and manpower required for testing-related preparation.

15 Claims, 7 Drawing Sheets

AUTOMATIC MOUNTING AND DEMOUNTING DEVICE AND SYSTEM FOR MOTOR TESTING PLATFORM

BACKGROUND OF THE INVENTION

Field of the Invention

The present disclosure relates to centering devices of testing apparatuses for testing motors and, more particularly, to an automatic mounting and demounting device and system for a motor testing platform.

Description of the Prior Art

The preparation for the testing of a motor's dynamics requires spending much time aligning the axle of a motor under test with the axles of testing apparatuses.

Conventionally, a testing platform which a motor under test is mounted on is manually moved with an adjustment device to an appropriate position relative to the axle of a dynamometer motor with a view to reducing eccentricity-induced measurement errors and mechanical vibration.

Centering a motor under test and dynamometer motor entails an experienced worker's adjusting the position of the motor under test and fine-tuning the degree of alignment of a reversible motor so as for them to fall within specified ranges. Although test instruments provide precise measurement values, they cannot provide informative data about what kind of calibrations the worker has to carry out.

Therefore, not only does the worker's expertise have a significant effect on the preparation for the testing of the motor under test, but both the speed and correctness of determination of accuracy are also crucial to the efficiency of operation of the motor testing platform.

SUMMARY OF THE INVENTION

It is an objective of the present disclosure to enhance the ease of use of a motor testing platform.

Another objective of the present disclosure is to reduce the time and manpower required for testing-related preparation for axis centering.

Yet another objective of the present disclosure is to optimize the axis centering required for motor dynamics testing and enable it to be correctly automated.

In order to achieve the above and other objectives, the present disclosure provides an automatic mounting and demounting device for a motor testing platform, adapted to enable a control host to control automatic mounting and demounting between an axle of a motor under test and an axle of a testing apparatus, comprising a mobile platform and a positional information sensing member. The mobile platform is coupled to the control host and comprises: a multi-axis motion unit and a carrier disposed on the multi-axis motion unit and adapted to fix the motor under test in place. The positional information sensing member is coupled to the control host, disposed opposite the carrier, and adapted to generate positional information through an upright wall of the carrier disposed at a standard position. Given the positional information, the control host correspondingly controls the multi-axis motion unit, such that the carrier is moved to a corresponding position, thereby attaining alignment and connection or separation of the axle of the motor under test and the axle of the testing apparatus.

In an embodiment of the present disclosure, the automatic mounting and demounting device further comprises a first connection unit disposed at an axial end portion of the motor under test and a flexible coupling disposed at an axial end portion of the testing apparatus, the flexible coupling further comprising a second connection unit, wherein the first connection unit and the second connection unit are connected upon alignment of the axle of the motor under test and the axle of the testing apparatus.

In an embodiment of the present disclosure, the first connection unit has a plurality of first dentate portions arranged therearound and protruding outward radially, and the second connection unit has a through hole, wherein a plurality of second dentate portions are disposed on an inner wall of the through hole and protruding radially.

In an embodiment of the present disclosure, the positional information sensing member comprises an image sensor and a distance sensor which are disposed on a side of the testing apparatus, the image sensor being adapted to obtain an image data attributed to the upright wall having a marking information, and the distance sensor being adapted to obtain a distance data about a distance between the distance sensor and the upright wall, wherein the image data and the distance data are the positional information.

In an embodiment of the present disclosure, the positional information sensing member comprises an image sensor coupled to the control host and disposed above the mobile platform and the axial end portion of the testing apparatus to capture images of an axial alignment connection zone between the motor under test and the testing apparatus and thereby generate the positional information.

In an embodiment of the present disclosure, the multi-axis motion unit comprises: first through third axis rail members as well as first and second axis motion units; a first axis motion unit disposed on the first axis rail member, wherein two mounting walls are erected on two sides of the first axis motion unit, respectively; a second axis rail member disposed on each said mounting wall; a second axis motion unit underpinned by the second axis rail member and thus disposed above the first axis motion unit; and a third axis rail member disposed on the second axis motion unit to underpin the carrier, thereby allowing the carrier to move along a third axis.

In an embodiment of the present disclosure, the second axis rail member has at least four second axis rails, and the mounting walls each have at least two said second axis rails, such that the second axis rails underpinning the second axis motion unit undergoes differential adjustment along a second axis, thereby allowing the normal vector to the wall surface of the upright wall of the carrier to rotate about a first axis or the third axis.

In an embodiment of the present disclosure, the third axis rail member has at least two third axis rails whereby the third axis rails underpinning the carrier undergo differential adjustment along the third axis, such that the normal vector to the wall surface of the upright wall of the carrier rotates about a second axis.

In order to achieve the above and other objectives, the present disclosure further provides an automatic mounting and demounting system for a motor testing platform, comprising a testing apparatus, a mobile platform, a positional information sensing member, a table and a control host. The testing apparatus comprises an axial end portion adapted to be connected to an axle of the motor under test. The mobile platform comprises a multi-axis motion unit and a carrier disposed on the multi-axis motion unit and adapted to fix the motor under test in place. The positional information sensing member is disposed opposite the carrier and adapted to generate positional information through an upright wall of the carrier disposed at a standard position. The table carries the testing apparatus, the mobile platform and the positional information sensing member. The control host is coupled to the testing apparatus, the multi-axis motion unit and the positional information sensing member. The control host correspondingly adjusts the multi-axis motion unit according to the positional information, so as to attain automatic alignment and connection or separation of the axle of the motor under test and the axial end portion of the testing apparatus.

In an embodiment of the present disclosure, the testing apparatus further comprises a dynamometer motor, a torsiometer and a flexible coupling, wherein the torsiometer and the flexible coupling are disposed on the axial end portion of the testing apparatus, the flexible coupling having a second connection unit adapted to be connected to a first connection unit disposed at the axial end portion of the motor under test, wherein the first connection unit and the second connection unit are connected upon alignment of the axle of the motor under test and the axle of the testing apparatus.

In an embodiment of the present disclosure, during an automatic alignment and connection process, the control host causes the axle of the motor under test or the axle of the testing apparatus to rotate to a certain extent and thereby attains connection of the first connection unit and the second connection unit.

In an embodiment of the present disclosure, the positional information sensing member comprises a first image sensor and a distance sensor which are disposed on a side of the testing apparatus, the first image sensor obtaining first image data of the upright wall, and the distance sensor obtaining first distance data pertaining to a distance between the distance sensor and the upright wall. Wherein the control host obtains positional information pertaining to the carrier along the first and second axes according to a comparison of the first image data and a standard image data, obtains positional information pertaining to the carrier along the third axis according to the first distance data, controls the multi-axis motion unit to cause the carrier to move along the first and second axes until matching the standard image data, and then controls the multi-axis motion unit to cause the carrier to move along the third axis, thereby attaining alignment and connection of the axles.

In an embodiment of the present disclosure, the control host determines gradient of the axial end portion of the motor under test on the second axis according to a diminution amount of the first image data relative to the standard image data on the second axis and determines gradient of the axial end portion of the motor under test on the first axis according to a diminution amount of the first image data relative to the standard image data on the first axis.

Therefore, the mobile platform is controlled with the positional information generated by the positional information sensing member and in accordance with the upright wall, such that the carrier for carrying the motor under test is automatically driven to a corresponding position, so as to attain the alignment and connection or separation of the axle of the motor under test and the axle of the testing apparatus, optimize preparation for motor dynamics testing, enable the preparation for motor dynamics testing to be correctly automated, and reduce the time and manpower required for testing-related preparation.

BRIEF DESCRIPTION OF THE DRAWINGS

FIG. 6($b$) is a schematic view of the first shift state of match sensing in the embodiment illustrated by FIG. 6($a$).

FIG. 6($c$) is a schematic view of the second shift state of match sensing in the embodiment illustrated by FIG. 6($a$).

DETAILED DESCRIPTION OF THE EMBODIMENTS

The technical characteristics, contents, advantages and effects of the present invention will become apparent from the following detailed description taken with the accompanying drawing.

In the disclosure, descriptive terms such as "a" or "one" are used to describe the unit, component, member, module, structure, device, system, portion, region or apparatus, and are for illustration purposes and providing generic meaning to the scope of the present invention. Therefore, unless otherwise explicitly specified, such description should be understood as including one or at least one, and a singular number also includes a plural number.

In the disclosure, descriptive terms such as "include, comprise, have" or other similar terms are not for merely limiting the essential elements listed in the disclosure, but can include other elements that are not explicitly listed and are however usually inherent in the unit, component, member, module, structure, device, system, portion, region or apparatus.

In the disclosure, the terms similar to ordinals such as "first" or "second" described are for distinguishing or referring to associated identical or similar units, components, members, modules, structures, devices, system, portions, apparatus, regions, signal, or steps, and do not necessarily imply the orders of these units, components, members, modules, structures, devices, system, portions, apparatus, regions, signal, or steps in a spatial aspect. It should be understood that, in some situations or configurations, the ordinal terms could be interchangeably used without affecting the implementation of the present invention.

Figure 1:
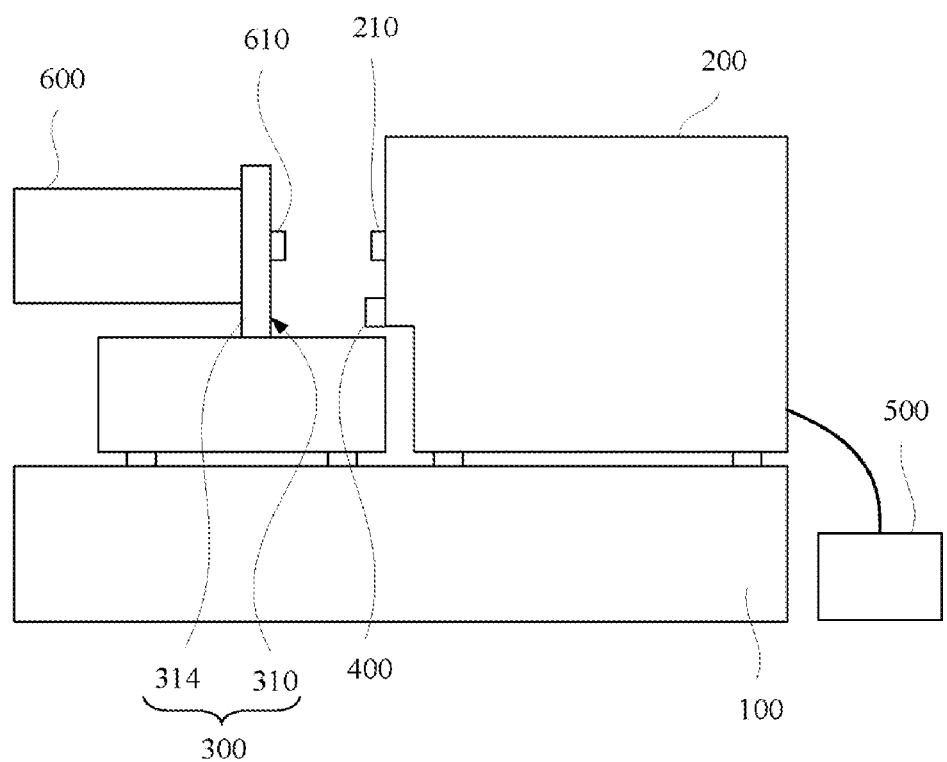
FIG. 1 is a schematic view of an automatic mounting and demounting system for a motor testing platform according to an embodiment of the present disclosure.

Referring to FIG. 1, there is shown a schematic view of an automatic mounting and demounting system for a motor testing platform according to an embodiment of the present disclosure. A table 100 carries a testing apparatus 200, a mobile platform 300, a positional information sensing member 400 and a motor under test 600. A control host 500 is coupled to the testing apparatus 200, the mobile platform 300 and the positional information sensing member 400. The testing apparatus 200 performs characteristics testing on the motor under test 600. For example, the testing apparatus 200 has a dynamometer, a torsiometer or the like. The mobile platform 300 and the positional information sensing member 400 together constitute the automatic mounting and demounting device.

The control host 500 not only controls the automatic mounting and demounting of axial end portions of the motor under test 600 and the testing apparatus 200 but also controls the execution of the testing process which follows the axial connection. The control host 500 is a self-contained external host shown in FIG. 1, a host integrally formed with the testing apparatus 200, or a host integrally formed with another apparatus.

The mobile platform 300 carries the motor under test 600; consequently, the motor under test 600 has its position changed under the control of the mobile platform 300 so as to be aligned and connected with an axial end portion 210 of the testing apparatus 200 to facilitate the testing process or removed from the axial end portion 210 of the testing apparatus 200 to terminate the testing process. The motor under test 600 is connected to the axial end portion 210 of the testing apparatus 200 so as to transmit the driving power of the motor under test 600 and thereby obtain related characteristics parameters of the motor under test 600.

The positional information sensing member 400 detects the position of the mobile platform 300, generates positional information accordingly, and provides the positional information to the control host 500. Consequently, the control host 500 controls the mobile platform 300 to adjustably move the motor under test 600 to a predetermined target position. Therefore, the alignment connection or removal of the motor under test 600 and the axial end portion 210 of the testing apparatus 200 is finished without a worker's performing manual adjustment but further brings about the acquisition of the capability to perform self-calibration and adjustment.

The acquisition of the positional information of the motor under test 600 is crucial to the precision of the automatic mounting and demounting. In an embodiment of the present disclosure, a carrier 310 on the mobile platform 300 serves as the means of determination. The carrier 310 has a base (i.e., a base 312 shown in FIG. 5) and an upright wall 314 which are fixed to the mobile platform 300. The positional information sensing member 400 is opposite the upright wall 314; consequently, the positional information sensing member 400 obtains the positional information based on the upright wall 314. Given the positional information and the predetermined target position in the control host 500, the mobile platform 300 can be controlled to enable the motor under test 600 to be moved to an expected position. The motor under test 600 is fixed to the upright wall 314, and thus the axial end portion 610 of the motor under test 600 is indirectly confirmed. Consequently, the predetermined target position in the control host 500 is configured according to the relative relationship of the axial end portion 210 of the testing apparatus 200 and the axial end portion 610 of the motor under test 600. The correctness of the obtained positional information about the motor under test 600 mounted on the carrier 310 can be determined in accordance with the upright wall 314. Selection and combination of the information obtained by using the upright wall 314 as a reflection medium and the obtained information on the upright wall 314 is conducive to enhancement of the precision of the automatic mounting and demounting, so as to minimize the tolerance which must be consumed to achieve connection and reduce the additional configuration cost otherwise incurred to acquire high degree of tolerance.

Figure 2:
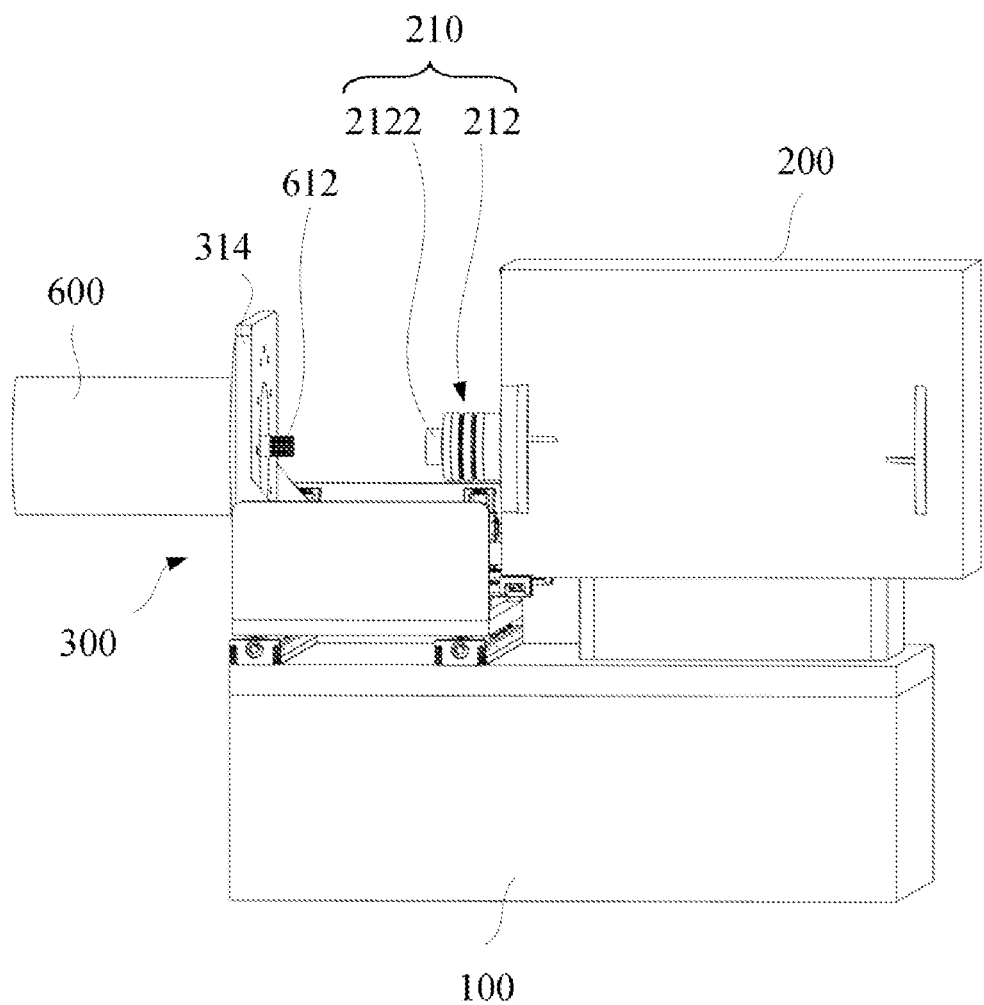
FIG. 2 is a schematic view of the connection structure of the automatic mounting and demounting device according to an embodiment of the present disclosure.

Referring to FIG. 2, there is shown a schematic view of the connection structure of the automatic mounting and demounting device according to an embodiment of the present disclosure. In addition to the mobile platform 300 and the positional information sensing member 400, the automatic mounting and demounting device comprises a first connection unit 612 disposed on the axial end portion 610 of the motor under test. A flexible coupling 212 is disposed on the axial end portion 210 of the testing apparatus 200. The flexible coupling 212 comprises a second connection unit 2122. The flexible coupling 212 allows for some errors arising from the connection of the first connection unit 612 and the second connection unit 2122, such that the first connection unit 612 and the second connection unit 2122 still have some degree of tolerance when connected.

Figure 3:
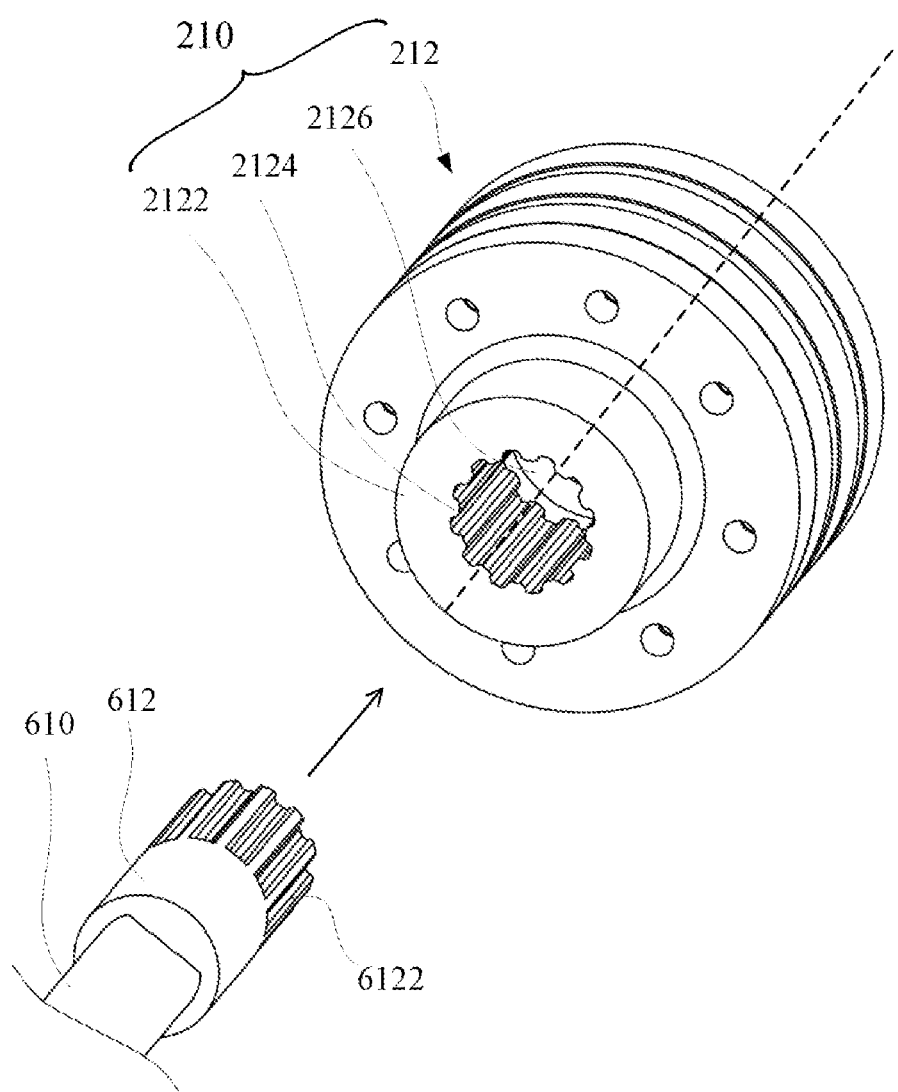
FIG. 3 is a schematic view of first and second connection units in the embodiment illustrated by FIG. 2.

Refer to FIG. 2 and FIG. 3. FIG. 3 is a schematic view of the first and second connection units of the automatic mounting and demounting device in the embodiment illustrated by FIG. 2. In the embodiment illustrated by FIG. 2, the first connection unit 612 has a plurality of first dentate portions 6122 arranged therearound and protruding outward radially. The second connection unit 2122 has a through hole 2126. A plurality of second dentate portions 2124 are disposed on the inner wall of the through hole 2126 and protruding radially. The first dentate portions 6122 and the second dentate portions 2124 enable the axial end portion 210 of the testing apparatus 200 and the axial end portion 610 of the motor under test 600 to be connected when aligned. For example, when the first connection unit 612 approaches the second connection unit 2122, the control host 500 controls the axial end portion 210 of the testing apparatus 200 to rotate slowly, thereby allowing the first dentate portions 6122 to mesh with the second dentate portions 2124 smoothly.

Figure 4:
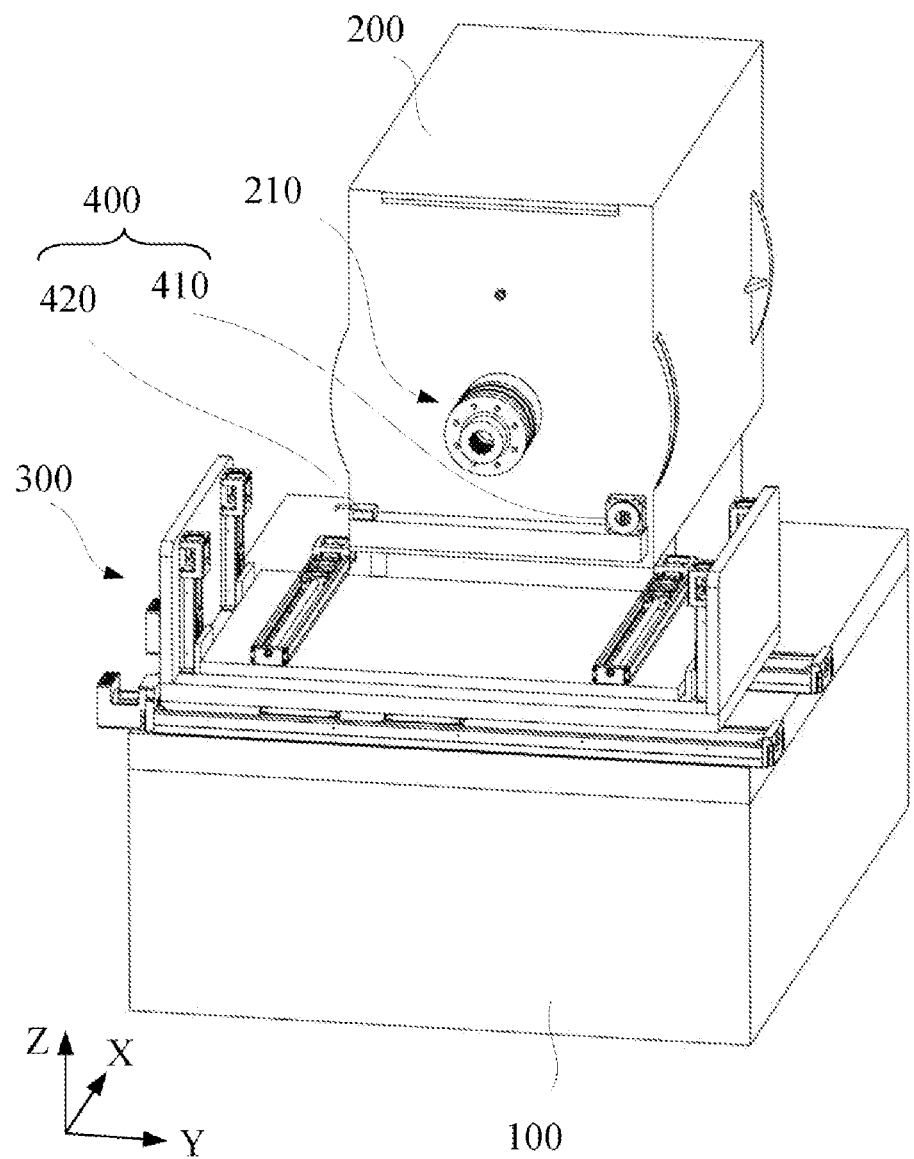
FIG. 4 is a schematic view of a positional information sensing member of the automatic mounting and demounting device according to an embodiment of the present disclosure.

Referring to FIG. 4, there is shown a schematic view of the positional information sensing member of the automatic mounting and demounting device according to an embodiment of the present disclosure. The positional information sensing member 400 comprises an image sensor 410 and a distance sensor 420 which are disposed on one side of the testing apparatus 200. The image sensor 410 captures image data attributed to the upright wall 314 (shown in FIG. 5) having a marking information. The marking information includes, for example, the outline of the upright wall 314 and an identification point on the upright wall 314, preferably a combination of the outline of the upright wall 314 and the identification point thereon. The distance sensor 420 captures a distance data about the distance between the distance sensor 420 and the upright wall 314. Consequently, the image sensor 410 obtains positional information about at least two axes, such as Y axis and Z axis, whereas the distance sensor 420 obtains positional information about the remaining axis, such as X axis.

For instance, the image sensor is a Complementary Metal-Oxide-Semiconductor (CMOS) sensor, a Charge-coupled Device (CCD) sensor, a Thin-Film Transistor (TFT) sensor, or any other sensor capable of capturing images. For instance, the distance sensor is an infrared rangefinder, a laser rangefinder, an ultrasonic rangefinder or any other sensor that measures distance from the observer to a target.

Figure 5:
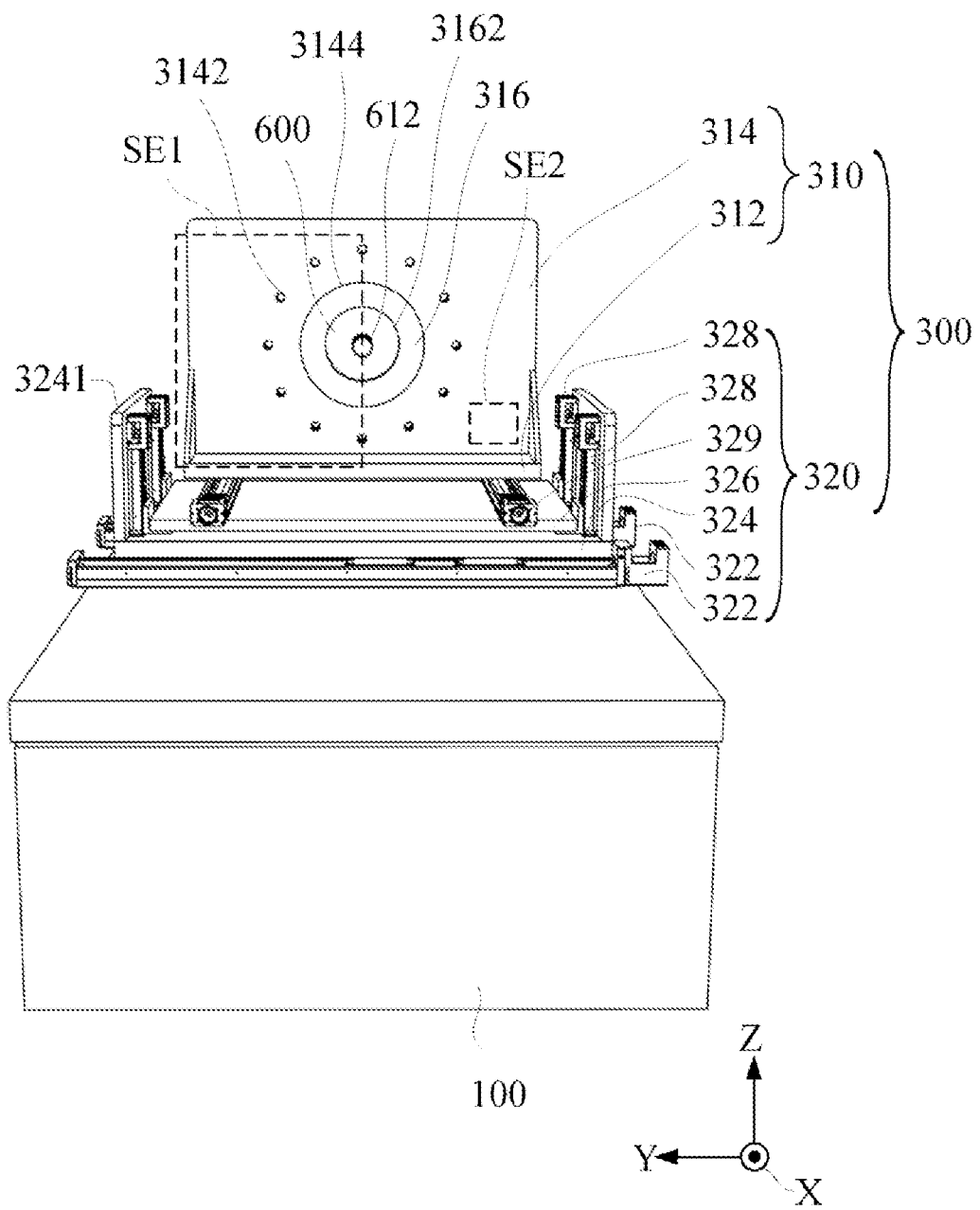
FIG. 5 is a schematic view of how sensing is effected by the positional information sensing member in the embodiment illustrated by FIG. 4.

Referring to FIG. 5, there is shown a schematic view of how sensing is effected by the positional information sensing member in the embodiment illustrated by FIG. 4. The carrier 310 on the mobile platform 300 has the base 312 and the upright wall 314 disposed on the base 312. The upright wall 314 and the base 312 are integrally formed or are separate but fitted together. The upright wall 314 has a fastening hole 3142 whereby a fixation plate 316 is fastened thereto and a through hole 3144. The fixation plate 316 allows the motor under test 600 to be fastened and fixed in place. The through hole 3144 defines a first image sensing zone SE1 at the sensing viewing angle of the positional information sensing member 400 shown in FIG. 4. Lying within the first image sensing zone SE1 are the fastening hole 3142, the outline of the rim of the through hole 3144, part of the outline of the fixation plate 316, and the outline of the first connection unit 612 disposed on the axial end portion 610 of the motor under test 600.

The marking information (for example, information displayed on the object itself and/or any other information added thereto, and the additional information is, for example, for use in an aligned pattern or symbol) which originates from the first image sensing zone SE1 and is obtained by the image sensor 410 is used to determine whether the carrier 310 has been driven to a predetermined position on a specific axis. Given the upright wall 314 on the carrier 310, a first distance sensing zone SE2 is defined for use by the distance sensor 420 to not only perform sensing and but also determine whether the carrier 310 has been driven to a predetermined position on a specific axis.

The first image sensing zone SE1 defines positional information of first axis (Y) and second axis (Z); consequently, the sensing image (serving as standard image data) which falls within the first image sensing zone SE1 when the axial end portion 610 of the motor under test 600 and the axial end portion 210 of the testing apparatus 200 are aligned with each other on the two axes (Y axis and Z axis) is stored in the control host 500. After that, the control host 500 controls a multi-axis motion unit 320. When the image displayed within the first image sensing zone SE1 matches the stored one, it indicates that the axial end portion 610 of the motor under test 600 and the axial end portion 210 of the testing apparatus 200 are aligned with each other on two axes (Y axis and Z axis). Therefore, the automatic mounting and demounting device of the present disclosure not only demonstrates enhanced alignment precision but also performs self-correction through the control (for image matching) of the control host 500 and thus attains precise alignment.

The first image sensing zone SE1 at least includes therein ⅓ of each of the outlines as follows: the outline of the rim of the through hole 3144, the outline of the rim of the fastening hole 3142, part of the outline of the fixation plate 316, and part of the outline of the first connection unit 612. Referring to FIG. 5, ½ of each of the outlines is for use in determining positional information. The fastening hole 3142, the through hole 3144, a through hole 3162 of the fixation plate 316, and the first connection unit 612 together form a special geometric outline group and thus display a marking information, thereby enhancing alignment precision.

In a variant embodiment, the sensor of the positional information sensing member 400 is capable of capturing images only and captures the images from above the carrier 310 at a top-view angle, so as to obtain images of the top-view outlines of the upright wall 314, the first connection unit 612, and the second connection unit 2122 and thus obtain positional information of two axes, i.e., X axis and Y axis. Consequently, it is not necessary to cope with the alignment situation on Z axis while the multi-axis motion unit 320 of the mobile platform 300 is only controlled to move along two axes, i.e., X axis and Y axis, thereby being applicable to the aspect where Z axis is fixed in place by the structural arrangement of the multi-axis motion unit 320.

In the embodiment illustrated by FIG. 5, rail members in the multi-axis motion unit 320 comprise a first axis rail member 322 (Y axis), a second axis rail member 328 (Z axis), and a third axis rail member 329 (X axis). The first axis motion unit 324 is disposed on the first axis rail member 322, such that the first axis motion unit 324 moves along Y axis. Owing to the laterally positioned second axis rail member 328, the second axis motion unit 326 is disposed above the platform of the first axis motion unit 324 and moves along Z axis. The second axis rail member 328 is disposed on mounting walls 3241 erected on the two sides of the first axis motion unit 324, respectively. The third axis rail member 329 is disposed on the second axis motion unit 326 and underpins the base 312 of the carrier 310, such that the carrier 310 moves along X axis because of the third axis rail member 329. Therefore, the control host 500 controls the position of the carrier 310 through the multi-axis motion unit 320 and thereby controls the alignment of the axial end portion 610 of the motor under test 600 and the axial end portion 210 of the testing apparatus 200.

Regarding the control of the multi-axis motion unit 320, positional information pertaining to the carrier 310 along first (Y) axis and second (Z) axis is obtained by comparison of image data and stored image data (standard image data). The control host 500 obtains positional information pertaining to the carrier 310 along third (X) axis in accordance with distance data. The control host 500 controls the multi-axis motion unit 320 to drive the carrier 310 moving along the first and second axes until matching the standard image data and then controls the multi-axis motion unit 320 to drive the carrier 310 moving along the third axis until matching the stored distance data, so as to attain axial alignment and connection. During the process of automatic alignment and connection, the control host 500 causes the axle of the motor under test 600 or the axle of the testing apparatus 200 to rotate to a certain extent (for example, rotate slowly by a specific angle), such that the first connection unit 612 and the second connection unit 2122 are smoothly connected.

Separation of otherwise aligned axles (to terminate the testing process) requires the control host 500 to cause the carrier 310 to move along the third axis (X) away from the axle of the testing apparatus 200 and then cause the carrier 310 to move along the first (Y) axis and second (Z) axis to the initial position, so as for the motor under test 600 to be demounted.

Additional match sensing entails additional alignment and confirmation, which is achieved as follows: detection and adjustment in an oblique scenario is also attained by the automatic mounting and demounting device and system of the present disclosure, because oblique scenarios cannot be ruled out, and thus precise alignment and confirmation cannot be achieved solely by adjustment based on X, Y, Z axes.

Figure 6A:
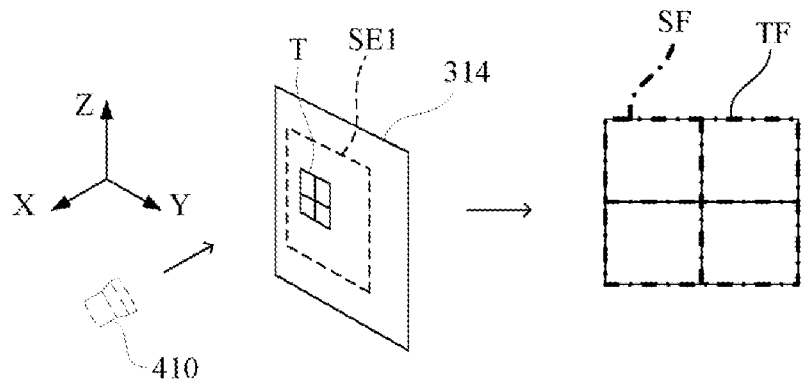
FIG. 6($a$) is a schematic view of the state of match sensing according to an embodiment of the present disclosure.
Figure 6B:
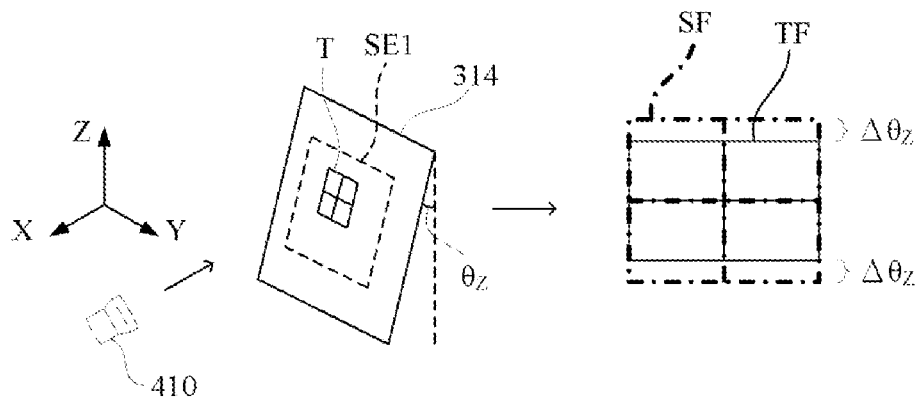
Figure 6C:
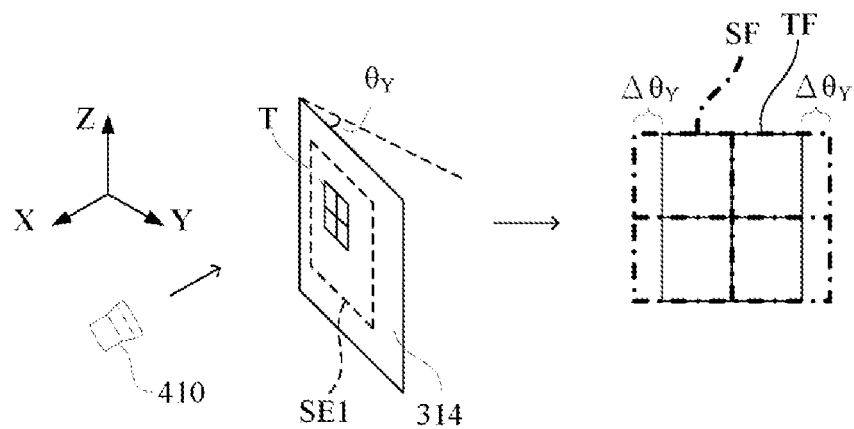

Refer to FIGS. 6(*a*)~6(*c*). FIG. 6(*a*) is a schematic view of the state of match sensing according to an embodiment of the present disclosure. FIG. 6(*b*) is a schematic view of the first shift state of match sensing in the embodiment illustrated by FIG. 6(*a*). FIG. 6(*c*) is a schematic view of the second shift state of match sensing in the embodiment illustrated by FIG. 6(*a*). The upright wall 314, image sensor 410, first image sensing zone SE1, and exemplary pattern T adapted for use in alignment and disposed in the first image sensing zone SE1 are schematically shown on the left sides of FIGS. 6(*a*)~6(*c*). Identification image data TF (functioning as marking information) of the exemplary pattern T is obtained from the first image sensing zone SE1 by the image sensor 410 and then compared with standard image data SF stored in the control host. The state of the comparison is shown on the right sides of FIGS. 6(*a*)~6(*c*). In the presence of an oblique scenario, images of the exemplary pattern T obtained by the image sensor 410 diminish, and in this embodiment the diminution of the images functions as a criterion for determining whether an oblique scenario exists.

As shown in FIG. 6(*a*), in the absence of an oblique scenario, after the exemplary pattern T on the upright wall 314 has been imaged, the identification image data TF and standard image data SF completely overlap each other as revealed by recognition and comparison of images. In the embodiment illustrated by FIG. 6(*a*), both the frame line and the center completely overlap each other.

As shown in FIG. 6(*b*), the second axis (Z axis) is oblique (or rotates about the first axis Y) with a shift amount $\theta_Z$. After the exemplary pattern T on the upright wall 314 has been imaged, the identification image data TF shifts relative to the standard image data SF on the second axis (Z axis) as revealed by recognition and comparison of images. The identification image data TF appears in the form of flattened graphic data (determined diminution amount) on the second axis (Z axis) and thus displays vertical shift amount $\Delta\theta_Z$ as shown in FIG. 6(*b*). The corresponding adjustment enables rotation of the normal vector to the wall surface of the upright wall 314 about the first axis (Y axis). The adjustment is determined in a predetermined rotation direction. When the shift amount $\Delta\theta_Z$ no longer increases but begins to decrease, it is feasible to keep the initial rotational direction and continue with the adjustment until the shift amount $\Delta\theta_Z$ vanishes. Conversely, when the adjustment is determined in the fixed rotation direction, the shift amount $\Delta\theta_Z$ increases, thereby indicating that the adjustment is carried out in a wrong direction; consequently, not only must the adjustment be carried out in the opposite direction, but it is also necessary to cause the shift amount $\Delta\theta_Z$ to decrease rather than increase and keep carrying out the adjustment until the shift amount $\Delta\theta_Z$ vanishes.

As shown in FIG. 6(*c*), the first axis (Y axis) is oblique (or rotates about the second axis Z) with a shift amount $\theta_Y$. After the exemplary pattern T on the upright wall 314 has been imaged, the identification image data TF shifts relative to the standard image data SF on the first axis (Y axis) as revealed by recognition and comparison of images. The identification image data TF appears in the form of flattened graphic data (determined diminution amount) on the first axis (Y axis) and thus displays transverse shift amount $\Delta\theta_Y$ as shown in FIG. 6(*c*). The corresponding adjustment enables rotation of the normal vector to the wall surface of the upright wall 314 about the second axis (Z axis). The adjustment is determined in a predetermined rotation direction. When the shift amount $\Delta\theta_Y$ no longer increases but begins to decrease, it is feasible to keep the initial rotational direction and continue with the adjustment until the shift amount $\Delta\theta_Y$ vanishes. Conversely, when the adjustment is determined in the fixed rotation direction, the shift amount $\Delta\theta_Y$ increases, thereby indicating that the adjustment is carried out in a wrong direction; consequently, not only must the adjustment be carried out in the opposite direction, but it is also necessary to cause the shift amount $\Delta\theta_Y$ to decrease rather than increase and keep carrying out the adjustment until the shift amount $\Delta\theta_Y$ vanishes.

Figure 7:
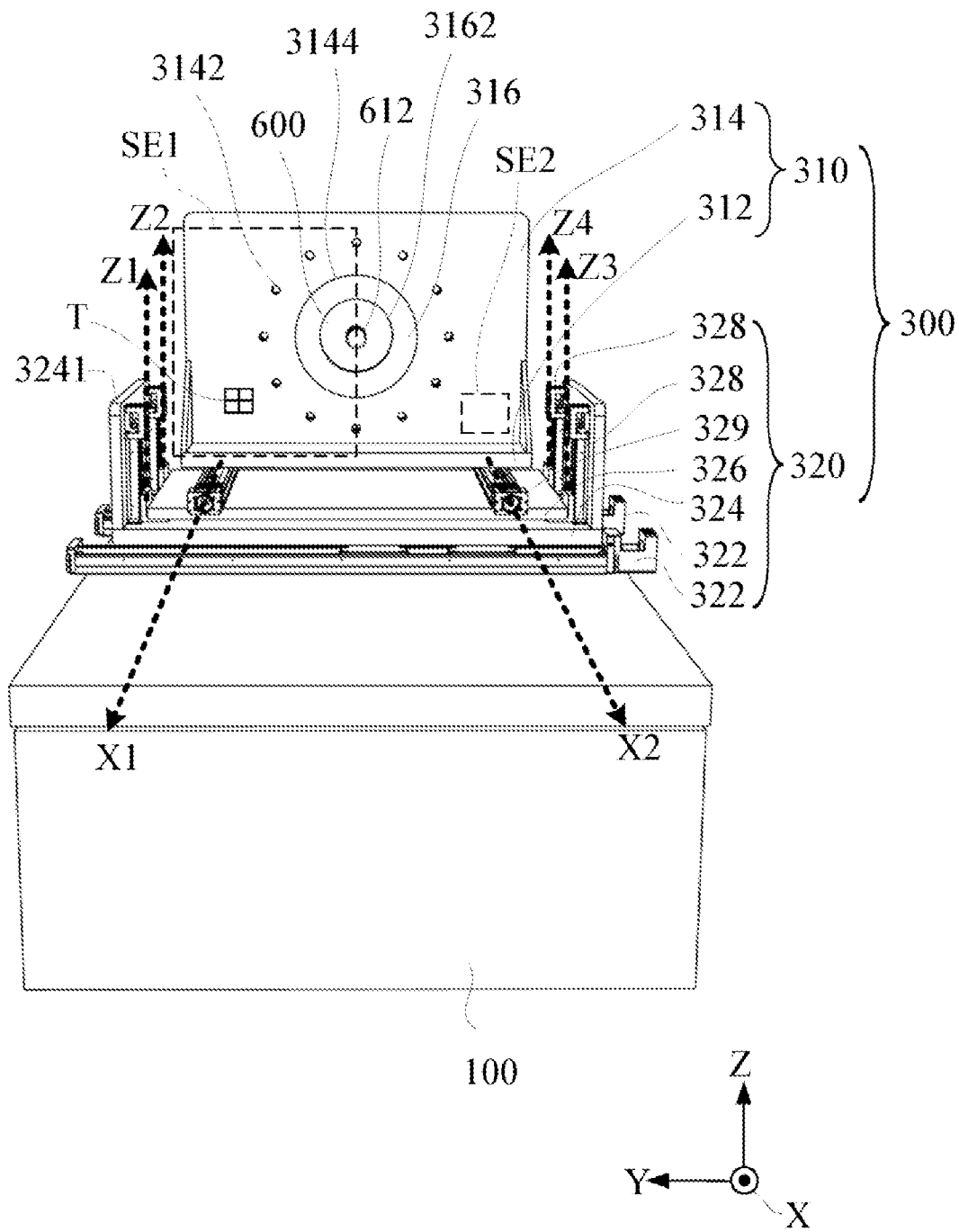
FIG. 7 is a schematic view of how sensing is effected by the positional information sensing member in the embodiment illustrated by FIG. 6($a$).

Referring to FIG. 7, there is shown a schematic view of how sensing is effected by the positional information sensing member in the embodiment illustrated by FIG. 6(*a*). The second axis rail member 328 has four second axis rails and thus has first through fourth Z-axis adjustment directions Z1~Z4. Each said mounting wall 3241 has two second axis rails, such that the second axis rails for carrying the second axis motion unit 326 can undergo differential adjustment along the second axis, thereby allowing the normal vector to the wall surface of the upright wall 314 of the carrier 310 to rotate about the first axis (Y) or third axis (X).

Referring to FIG. 6(*b*), the first Z-axis adjustment direction Z1 and the third Z-axis adjustment direction Z3 are paired, whereas the second Z-axis adjustment direction Z2 and the fourth Z-axis adjustment direction Z4 are paired, thereby allowing the normal vector to the wall surface of the upright wall 314 to rotate about the first axis (Y); consequently, $\theta_Z$ is adjusted, and thus the shift amount $\Delta\theta_Z$ is reduced to zero, thereby achieving gradient control. By contrast, the first Z-axis adjustment direction Z1 and the second Z-axis adjustment direction Z2 are paired, whereas the third Z-axis adjustment direction Z3 and the fourth Z-axis adjustment direction Z4 are paired, so as to allow the normal vector to the wall surface of the upright wall 314 to rotate about the third axis (X), thereby exercising additional gradient control over the rotational shift amount about the third axis (X).

Referring to FIG. 7, the third axis rail member 329 has two third axis rails and thus has first and second X axis adjustment directions X1, X2. The third axis rail member 329 enables the third axis rails carrying the carrier 310 to undergo differential adjustment along the third axis, thereby allowing the normal vector to the wall surface of the upright wall 314 of the carrier 310 to rotate about the second axis (Z).

Referring to FIG. 6(*c*), when the first X-axis adjustment direction X1 and the second X-axis adjustment direction X2 undergo differential adjustment, the base 312 rotates slightly about Z axis, thereby allowing the normal vector to the wall surface of the upright wall 314 to rotate about the second axis (Z); consequently, $\theta_Y$ is adjusted, and thus the shift amount $\Delta\theta_Y$ is reduced to zero, thereby achieving gradient control.

In conclusion, the mobile platform and the positional information sensing member together enable the axis centering process for the motor dynamics testing to be effectively and correctly carried out automatically. Then, the carrier is imaged with the positional information sensing member, so as to quickly and accurately carry out an automatic centering process, enhance the ease of use of the motor testing platform, and reduce the time and manpower required for testing-related preparation for axis centering.

While the invention has been described by means of specific embodiments, numerous modifications and variations could be made thereto by those skilled in the art without departing from the scope and spirit of the invention set forth in the claims.

What is claimed is:

1. An automatic mounting and demounting device for a motor testing platform, adapted to enable a control host to control automatic mounting and demounting between an axle of a motor under test and an axle of a testing apparatus, comprising:

a mobile platform coupled to the control host and comprising a multi-axis motion unit and a carrier disposed on the multi-axis motion unit and adapted to fix the motor under test in place; and a positional information sensing member coupled to the control host, disposed opposite the carrier, and adapted to generate positional information through an upright wall of the carrier disposed at a standard position, wherein the positional information sensing member comprises an image sensor and a distance sensor which are disposed on a side of the testing apparatus, the image sensor being adapted to obtain an image data attributed to the upright wall and a pattern marked thereon, and the distance sensor being adapted to obtain a distance data about a distance between the distance sensor and the upright wall, wherein the image data and the distance data are the positional information, wherein, given the positional information, the control host correspondingly controls the multi-axis motion unit, such that the carrier is moved to a corresponding position, thereby attaining alignment and connection or separation of the axle of the motor under test and the axle of the testing apparatus.

2. The automatic mounting and demounting device of claim 1, further comprising a first connection unit disposed at an axial end portion of the motor under test and a flexible coupling disposed at an axial end portion of the testing apparatus, the flexible coupling further comprising a second connection unit, wherein the first connection unit and the second connection unit are connected upon alignment of the axle of the motor under test and the axle of the testing apparatus.

3. The automatic mounting and demounting device of claim 2, wherein the first connection unit has a plurality of first dentate portions arranged therearound and protruding outward radially, and the second connection unit has a through hole, wherein a plurality of second dentate portions are disposed on an inner wall of the through hole and protruding radially.

4. The automatic mounting and demounting device of claim 1, wherein the image sensor is one of a Complementary Metal-Oxide-Semiconductor (CMOS) sensor, a Charge-coupled Device (CCD) sensor, and a Thin-Film Transistor (TFT) sensor, whereas the distance sensor is one of an infrared rangefinder, a laser rangefinder, and an ultrasonic rangefinder.

5. The automatic mounting and demounting device of claim 1, wherein the positional information sensing member comprises an image sensor coupled to the control host and disposed above the mobile platform and the axial end portion of the testing apparatus to capture images of an axial alignment connection zone between the motor under test and the testing apparatus and thereby generate the positional information.

6. The automatic mounting and demounting device of claim 1, wherein the multi-axis motion unit comprises:
a first axis rail member;
a first axis motion unit disposed on the first axis rail member, wherein two mounting walls are erected on two sides of the first axis motion unit, respectively;
a second axis rail member disposed at each said mounting wall;
a second axis motion unit underpinned by the second axis rail member and thus disposed above the first axis motion unit; and
a third axis rail member disposed on the second axis motion unit to underpin the carrier, thereby allowing the carrier to move along a third axis.

7. The automatic mounting and demounting device of claim 6, wherein the second axis rail member has at least four second axis rails, and the mounting walls each have at least two said second axis rails, such that the second axis rails underpinning the second axis motion unit undergoes differential adjustment along a second axis, thereby allowing the normal vector to the wall surface of the upright wall of the carrier to rotate about a first axis or the third axis.

8. The automatic mounting and demounting device of claim 6, wherein the third axis rail member has at least two third axis rails whereby the third axis rails underpinning the carrier undergo differential adjustment along the third axis, such that the normal vector to the wall surface of the upright wall of the carrier rotates about a second axis.

9. An automatic mounting and demounting system for a motor testing platform, comprising:
a testing apparatus comprising an axial end portion adapted to be connected to an axle of a motor under test;
a mobile platform comprising a multi-axis motion unit and a carrier disposed on the multi-axis motion unit and adapted to fix the motor under test in place;
a positional information sensing member disposed opposite the carrier and adapted to generate positional information through an upright wall of the carrier disposed at a standard position, the positional information sensing member comprises a first image sensor and a distance sensor which are disposed on a side of the testing apparatus, the first image sensor obtaining first image data of the upright wall, and the distance sensor obtaining first distance data pertaining to a distance between the distance sensor and the upright wall;
a table for carrying the testing apparatus, the mobile platform and the positional information sensing member; and
a control host coupled to the testing apparatus, the multi-axis motion unit and the positional information sensing member and adapted to correspondingly adjust the multi-axis motion unit according to the positional information, so as to effect automatic alignment and connection or separation of the axle of the motor under test and the axial end portion of the testing apparatus.

10. The automatic mounting and demounting system of claim 9, wherein the testing apparatus further comprises a dynamometer motor, a torsiometer and a flexible coupling, wherein the torsiometer and the flexible coupling are disposed on the axial end portion of the testing apparatus, the flexible coupling having a second connection unit adapted to be connected to a first connection unit disposed at the axial end portion of the motor under test, wherein the first connection unit and the second connection unit are connected upon alignment of the axle of the motor under test and the axle of the testing apparatus.

11. The automatic mounting and demounting system of claim 10, wherein, during an automatic alignment and connection process, the control host causes the axle of the motor under test or the axle of the testing apparatus to rotate to a certain extent and thereby attains connection of the first connection unit and the second connection unit.

12. The automatic mounting and demounting system of claim 9, wherein the control host obtains positional information pertaining to the carrier along the first and second axes according to a comparison of the first image data and a standard image data, obtains positional information pertaining to the carrier along the third axis according to the first distance data, controls the multi-axis motion unit to cause the carrier to move along the first and second axes until matching the standard image data, and then controls the multi-axis motion unit to cause the carrier to move along the third axis, thereby attaining alignment and connection of the axles.

13. The automatic mounting and demounting system of claim 12, wherein the control host determines gradient of the axial end portion of the motor under test on the second axis according to a diminution amount of the first image data relative to the standard image data on the second axis and determines gradient of the axial end portion of the motor under test on the first axis according to a diminution amount of the first image data relative to the standard image data on the first axis.

14. The automatic mounting and demounting system of claim 9, wherein separation of otherwise aligned axles requires the control host to cause the carrier to move along the third axis away from the axle of the testing apparatus and then cause the carrier to move along the first and second axes to the initial position.

15. The automatic mounting and demounting system of claim 9, wherein the positional information sensing member further comprises an image sensor coupled to the control host and disposed above the mobile platform and the axial end portion of the testing apparatus to capture images of an axial alignment connection zone between the motor under test and the testing apparatus and thereby generate the positional information.

\* \* \* \* \*